United States Patent Office 3,212,752
Patented Oct. 19, 1965

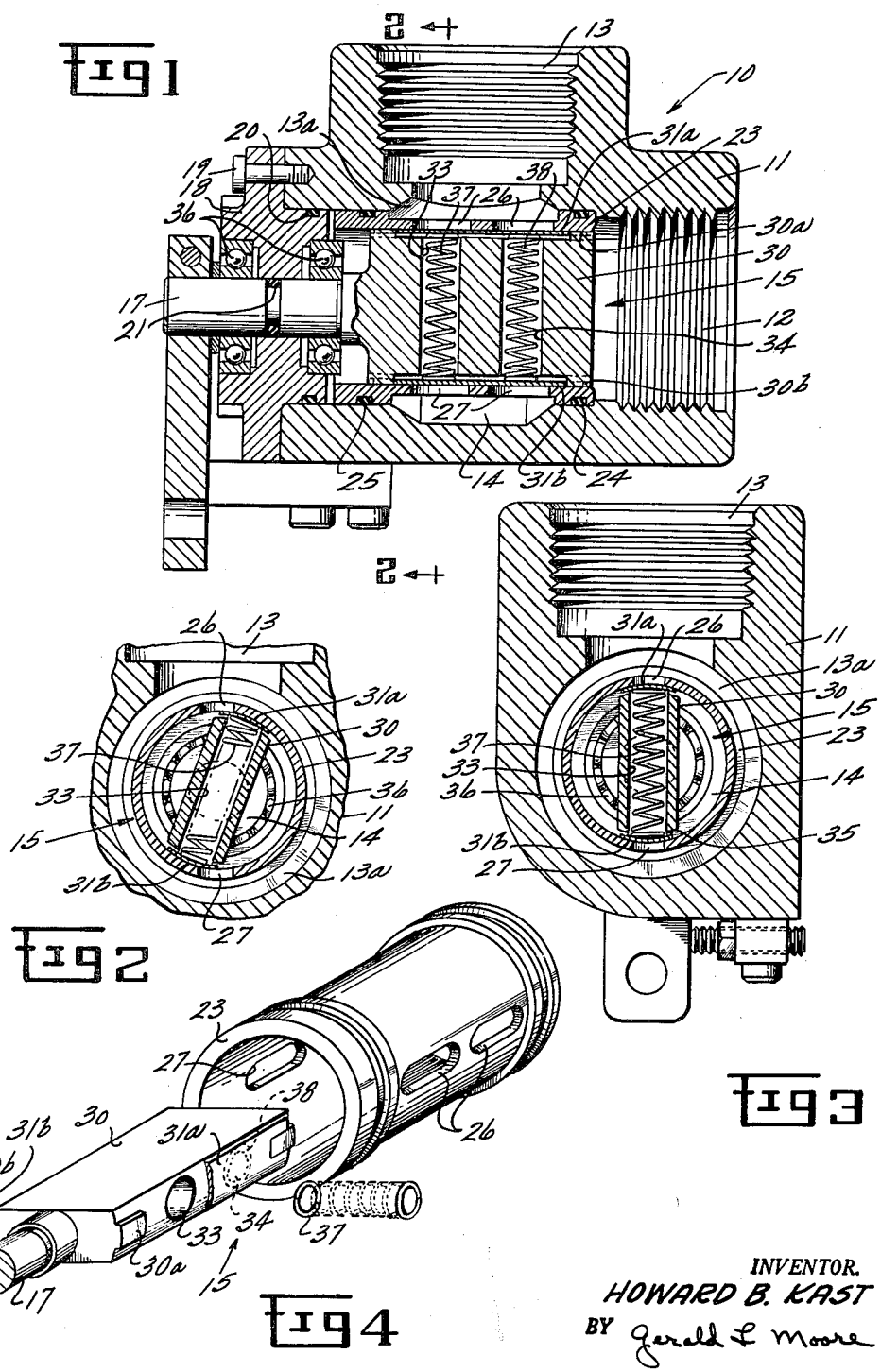

3,212,752
FLUID PRESSURE AND SPRING BIASED
SEALED FLOW CONTROL VALVE
Howard B. Kast, Fairfield, Ohio, assignor to General
Electric Company, a corporation of New York
Filed Apr. 15, 1963, Ser. No. 272,901
1 Claim. (Cl. 251—175)

The present invention relates to a flow valve and more particularly to a valve incorporating a pressure actuated mechanism to allow positive sealing action.

In flow control valves it is important that the valve be capable of stopping fluid flow completely thus requiring that close contact between the flow control member and the valve port be maintained for positive sealing. However to accomplish this very close tolerances generally must be maintained between the flow control member and the valve seat and these close tolerances are less effective with subsequent use of the valves since wear affects the mating of the parts and therefore the fluid control capabilities of the valve.

It is accordingly an object of this invention to provide a fluid pressure actuated mechanism within the flow control assembly of the valve to provide positive shutoff capabilities and compensate for greater tolerances and wear within the valve.

It is another object of this invention to provide a shutoff valve utilizing a flexible reed type closure member which, when the valve is actuated to the closed position, is forced by fluid pressure to flex and conform with the valve seat contour around the port and effectively seal against fluid flow through the port.

Other objects and many of the attendant advantages of this invention will be readily appreciated as the same becomes better understood by reference to the following detailed description when considered in connection with the accompanying drawings wherein:

FIG. 1 is a side cross-sectional view of the valve,

FIG. 2 is a partial end-view in cross section of the valve, along the lines 2—2 of FIG. 1 showing the valve in the open position, FIG. 3 is an end cross-sectional view of the valve along the lines 2—2 of FIG. 1 showing the valve in the closed position, and FIG. 4 is a partially exploded view of the flow control mechanism of the valve.

Referring now to the drawings, a flow control valve 10 is illustrated comprising a housing 11 having an inlet port 12 and an outlet port 13. Both of these ports connect with an internal cavity 14 in which fits a flow control assembly 15. The control assembly controls fluid flow from the inlet port 12 and the internal cavity 14 flowing out through the outlet cavity 13a and outlet port 13. This assembly is positioned by an actuating shaft 17 which extends through an end-wall 18, this end-wall being attached to the housing 11 by bolts 19 to allow removal of the assembly from the valve housing. A seal 20 seals between the end-wall and the housing while a seal 21 seals between the actuating shaft 17 and the end-wall to make the housing fluid tight.

Turning now to the flow control assembly a sleeve 23 fits within the cavity 14 with the seals 24 and 25 sealing between the cavity wall and the sleeve and ports 26 and 27 extending through the sleeve. The sleeve is generally cylindrical in shape with a reed support member 30 supported within the sleeve which may be rotated with respect to the sleeve by the attached shaft 17. Fitting over one sector of the outer diameter of this support member 30 are flexible reeds 31a and 31b fitting in the inset portions 30a and 30b of the reed support. Then flexible reeds are supported such that when the reed support member 30 is rotated to the correct position they overlap and close the outlet ports 26 and 27 extending through the sleeve 23. Internal cavities 33 and 34 may be provided in which springs 37 and 38 are located as illustrated to bias the reeds against the internal wall of the sleeve 23. Also while two pair of ports are illustrated in the sleeve of this embodiment it should be understood that any number of ports can be provided.

The flow control assembly shaft 17 is supported for rotation within the end-wall 18 through bearings 36 such that by rotating of this shaft with respect to the sleeve 23 the reed support 30 is rotated so as to either position the reeds 31a and 31b over the outlet ports 26 and 27 or move the reeds tangentially away from these ports. When the reeds are not positioned to close the ports fluid flow is allowed through the inlet 12 and the cavity 14 to flow out through the outlet port 13. However upon rotation of the reed support member 30 to a position wherein the reeds 31a and 31b are located over the outlet ports 26 and 27, respectively, the ports are blocked with the instantaneous reaction being the presence of pressured fluid within the sleeve 23 which exerts a force against the inside of the reeds while at the same time a low pressure fluid condition generally exists within the cavity outlet port 13a since any fluid here may flow out through the outlet port 13. By exerting a uniform force on each reed this fluid causes the reeds to flex, fit tightly against and seal the outer ports 26 and 27 to prevent any fluid flow therethrough. In this manner a positive acting flow control valve is provided.

By the use of a reed-type flow control assembly the tolerances between the assembly and the ports are less critical since the reeds are allowed to move radially and flex to conform to the contour of the ports. Further, the reeds and sleeve may be replaceable thereby rendering the valve easily repairable in case of wear, and the reeds are self-adjusting to tolerance changes due to such wear. The reeds also provide wide temperature and fluid handling capabilities since they may be formed of any metallic or corrosion resistant material having the necessary properties of flexibility.

While particular embodiments of the invention have been illustrated and described, it will be obvious to those skilled in the art that various changes and modifications may be made without departing from the invention and it is intended to cover in the appended claims all such changes and modifications that come within the true spirit and scope of the invention.

What is claimed as new and desired to be secured by Letters Patent of the United States is:

A valve comprising:
  a housing having inlet and outlet ports,
  an internal chamber within said housing,
  a sleeve sealingly received within said chamber and dividing the interior thereof, the interior of said sleeve communicating with the inlet port and the exterior thereof communicating with the outlet port,
  said sleeve having diametrically opposed openings for the flow of fluid between said ports,
  a valve assembly disposed within said sleeve and comprising a flattened body portion rotatably mounted therein and having diametrically opposed side edges alignable with the sleeve openings,
  flexible reed members respectively supported on said side edges of said body portion,
  said reed members being locked for rotation with said body portion and freely displaceable outwardly towards said sleeve for sealing engagement therewith,
  said reed members conforming to the inner surface of said sleeve and having a lateral extent sufficient to cover over the openings therein,
  compression spring means mounted on said body portion for rotation therewith, the opposite ends of said spring means being effective on the inner surfaces of said reed members to maintain same in sealing engagement with said sleeve, means to rotate said valve assembly to move said reed members from a position overlying the openings in said sleeve to a position angularly spaced therefrom to thereby control flow of fluid through said ports, the inner surfaces of said reed members being spaced from said body portion so that fluid pressure within said sleeve will further assist in maintaining said reed members in sealing engagement with the inner surface of said sleeve.

References Cited by the Examiner

UNITED STATES PATENTS

| | | | |
|---|---|---|---|
| 197,924 | 12/77 | Crickmer | 251—182 |
| 1,019,694 | 3/12 | Paul | 251—182 |
| 2,511,477 | 6/50 | Mueller | 251—182 |
| 2,566,071 | 8/51 | Schobert | 251—182 |
| 2,703,586 | 3/55 | Asker | 251—182 X |
| 2,711,185 | 6/55 | Rhodes | 251—314 X |
| 2,997,273 | 8/61 | Nilsen | 251—185 |

FOREIGN PATENTS 555,368    8/43   Great Britain.

ISADOR WEIL, *Primary Examiner.*
CLARENCE R. GORDON, *Examiner.*